United States Patent [19]

Masarik et al.

[11] Patent Number: 5,591,973
[45] Date of Patent: Jan. 7, 1997

[54] SIGNAL PROCESSOR FOR INFRARED CAMERA

[75] Inventors: David M. Masarik, Laguna Beach; Robert S. Hayes, Lawndale; Frank N. Cheung, Agoura; Robert W. Klatt, Rancho Palos Verdes, all of Calif.

[73] Assignee: Hughes Electronics, Los Angeles, Calif.

[21] Appl. No.: 226,796

[22] Filed: Apr. 12, 1994

[51] Int. Cl.⁶ .................................................. G01J 5/00
[52] U.S. Cl. .......................................................... 250/332
[58] Field of Search ............................................ 250/332

[56] References Cited

U.S. PATENT DOCUMENTS 5,083,204   1/1992   Heard et al. .......................... 348/164
5,201,582   4/1993   Lesniak ................................. 374/45

*Primary Examiner*—Constantine Hannaher
*Attorney, Agent, or Firm*—Michael W. Sales; Wanda K. Denson-Low

[57] ABSTRACT

An analog signal processor for use with an array of uncooled detectors. Each detector has an amplifier associated therewith and each amplifier provides gain. A first circuit (212, 294, 300, 220) is included for compensating for a DC offset of each detector/amplifier pair of the array. A second circuit (250, 294, 300) corrects for variations in the sensitivity of each detector/amplifier pair. As a result, the outputs each of the detector/amplifier pairs in response to a common input signal are equalized. In a specific implementation, additional circuits are included providing global automatic DC level control across the array (270, 280, 294, 300), global automatic gain control across the array (250, 262, 294, 300) and frame-to-frame offset adjustment (212, 230).

8 Claims, 6 Drawing Sheets

SIGNAL PROCESSOR FOR INFRARED CAMERA

BACKGROUND OF THE INVENTION

1. Field of the Invention

The present invention relates to imaging systems. More specifically, the present invention relates to circuits and systems for processing the outputs of pyroelectric detectors used in night vision systems.

2. Description of the Related Art

Night vision systems are well known in the art. Night vision systems typically include a cryogenically cooled linear detector array with an associated cryogenic subsystem, a scanning system which moves an image across a two-dimensional array, and a refractive optical system which focuses energy onto the detector. The detectors in the array either sense the heat of a body or detect low light levels.

While these systems have been used for military applications, the high cost of the scanning, cooling and optical systems associated therewith has heretofore limited the applicability of same for numerous other applications. Accordingly, there has been a need in the art for a low cost night vision system.

U.S. patent application Ser. No., 08/232,893 entitled "LOW COST NIGHT VISION CAMERA" filed on Apr. 12, 1994 by S. H. Klapper et al. discloses and claims a low cost camera for night vision systems including a focal plane array of uncooled detectors and an optically fast, optical arrangement for focusing energy from an input aperture onto the array. The array includes a plurality of pyroelectric detectors which in the illustrative embodiment are fabricated of barium-strontium-titanate material. Yet the characteristics and therefore the output of each detector is unique with respect to sensitivity, gain and DC offsets by way of example.

Hence, while barium-strontium-titanate uncooled detector technology provides low cost infrared detection, conventional techniques for processing and displaying the output signals provided thereby are less than satisfactory for certain high performance applications. Thus, a need remains in the art for a system and technique for processing and displaying signals provided by uncooled barium-strontium-titanate and other pyroelectric infrared detectors.

SUMMARY OF THE INVENTION

The need in the art is addressed by the present invention which provides an analog signal processor for use with an array of uncooled detectors. Each detector has an amplifier associated therewith and each amplifier provides gain. A first circuit is included for compensating for a DC offset of each detector/amplifier pair of the array. A second circuit corrects for variations in the sensitivity of each detector/amplifier pair. As a result, the outputs each of the detector/ amplifier pairs in response to a common input signal are equalized. In a particular application, the detectors are fabricated of barium-strontium-titanate.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
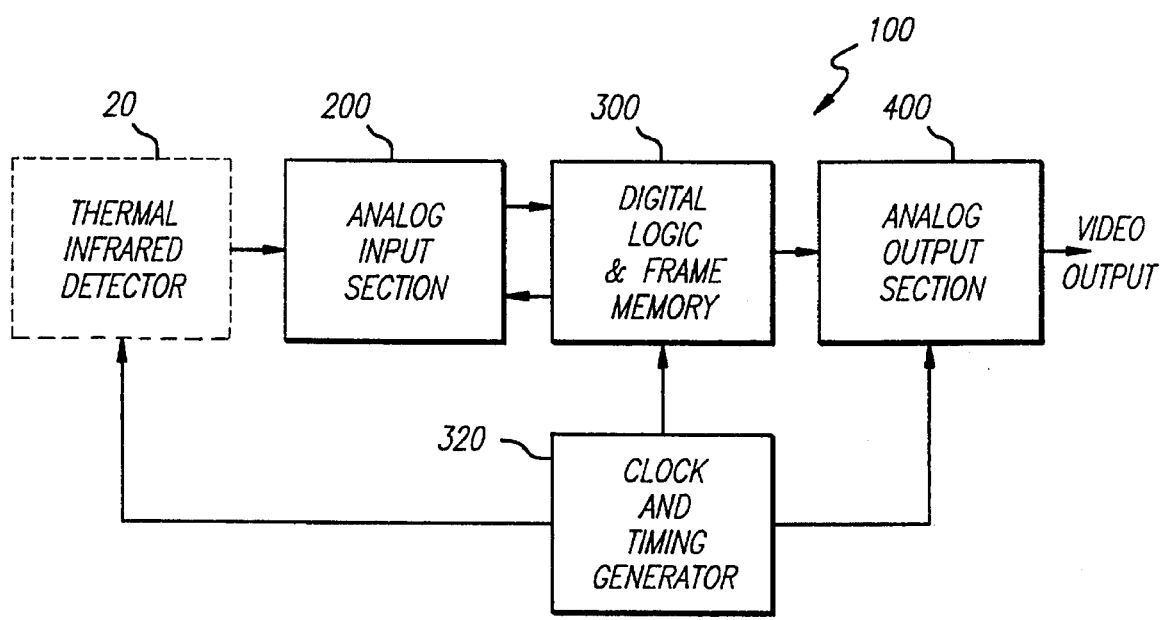
FIG. 1 is a block diagram of the signal processing system of the present invention.

FIG. 1 is a block diagram of the signal processing system 100 of the present invention. The thermal infrared detector 20 is shown in phantom. The detector is a focal plane array of uncooled infrared detectors such as pyroelectric barium-strontium-titanate (BST) detectors sold by the Texas Instruments company. This detector converts infrared energy into an electrical signal without the aid of an expensive cryogenic cooler as is typically required in conventional high-performance night vision imaging systems.

The characteristics of the detectors utilized in the illustrative embodiment are shown in Table I below:

TABLE I

| Parameter | Value or Requirement | Comment |
| --- | --- | --- |
| Detector resolution | | |
| Horizontal pixels | 328 | |
| Vertical pixels | 164 | |
| NETD (°C.) | $\leq 0.1$ | Average detector NET |
| Modulation transfer function | | Static square wave response at Nyquist frequency converted to MTF |
| Axial | $\geq 0.2$ | Best-phase line spread function at video output |
| Off-axis | $\geq 0.15$ | Area excluding central 20 percent of field of view |

In the table, "NET" refers to noise equivalent temperature and the axial and off-axis modulation transfer functions (MTF) are in units of lines per millimeter. (See also U.S. Pat. No. 4,080,532 entitled FERROELECTRIC IMAGING SYSTEM, issued Mar. 21, 1978 to G. S. Hopper; U.S. Pat. No. 5,010,251 entitled RADIATION DETECTOR ARRAY USING RADIATION SENSITIVE BRIDGES, issued Apr. 23, 1991 to J. Grinberg et al.; U.S. Pat. No. 5,021,663 entitled INFRARED DETECTOR, issued Jun. 4, 1991 to L. J. Hornbeck; U.S. Pat. No. 5,034,608 entitled INFRARED SENSOR OPERABLE WITHOUT COOLING, issued Jul. 23, 1991 to L. S. Tavrow et al.; and U.S. Pat. No. 5,288,649 entitled METHOD FOR FORMING UNCOOLED INFRARED DETECTOR, issued on Nov. 22, 1994 to W. Keenan.

Each detector has an amplifier (not shown) on a semiconductor circuit bonded to the back of the array. The amplifier provides an output signal indicative of a change in thermal energy incident on the associated detector. The amplifier outputs are scanned by a multiplexer and output as a serial analog signal.

BST detectors are most sensitive to thermal contrasts modulated at a predetermined range of frequencies. This modulation of the scene, called "chopping", is accomplished by rotating an optical diffusing or opaque element in front of the detector at the field rate to change the detector output on every field. This provides a thermal differential to each element in the array during each revolution. The chopping momentarily focuses, then defocuses the thermal scene from the detector element, allowing for a comparison of each element of the scene with the average value of the scene. The result is a first output from the detector-amplifier pair which represents the detection of energy from a focused scene and a second output which is a signal of equal and opposite polarity which represents the output of the detector amplifier resulting from the detector seeing the diffused scene. These two fields constitute a single frame.

The signal processing circuit 100 of FIG. 1 includes an analog input section 200 which receives these signals from the array 20 and corrects each pixel for sensitivity and offset. Then it offsets and scales the video signal to match the dynamic range of an analog-to-digital converter which converts the video signal to digital form using feedback loops. The signal processing circuit 100 further includes, a digital digital section 300, a timing circuit 320 and an analog output section 400.

Figure 2A:
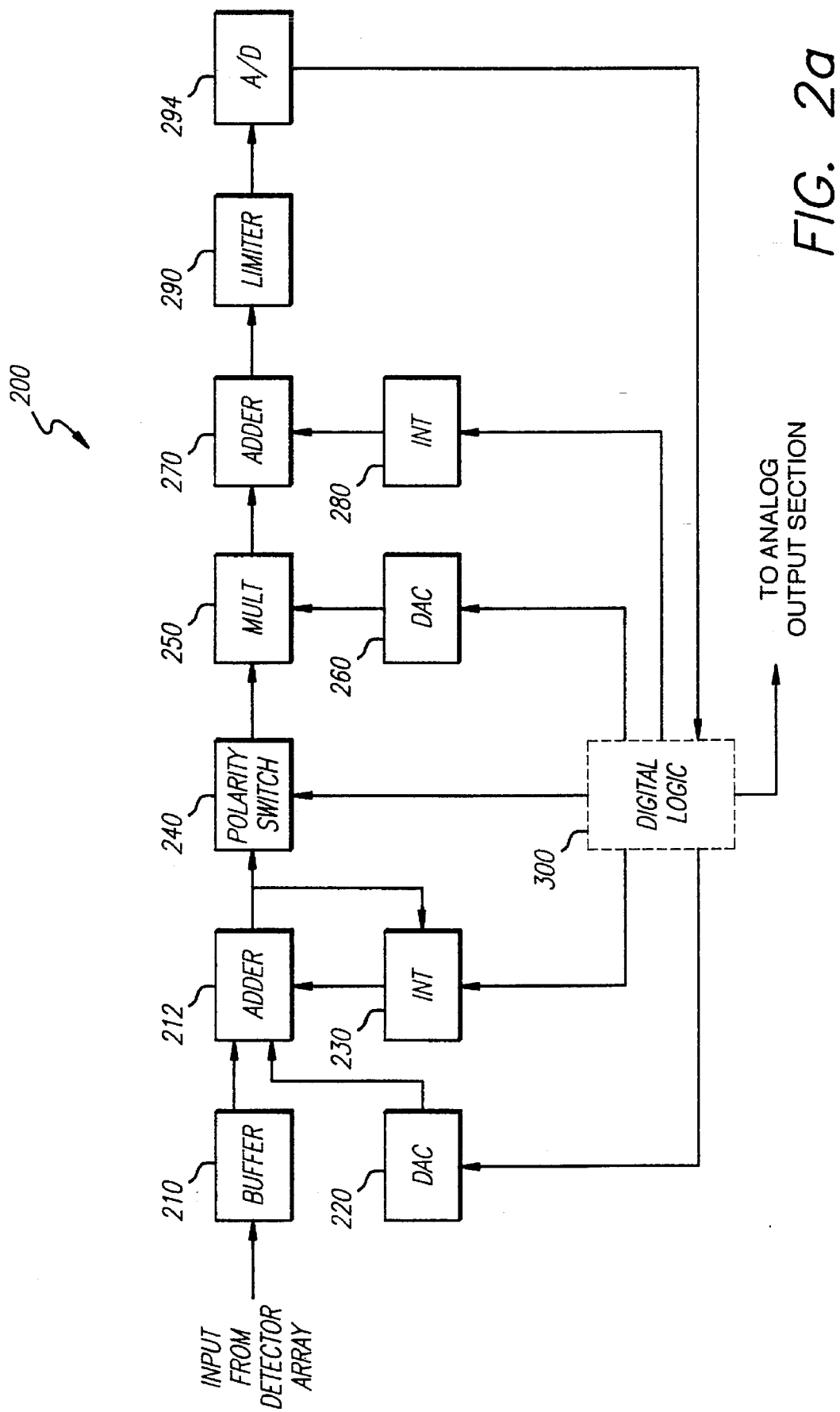
FIG. 2a is a block diagram of the analog input section of the signal processing system of the present invention.
Figure 2B:
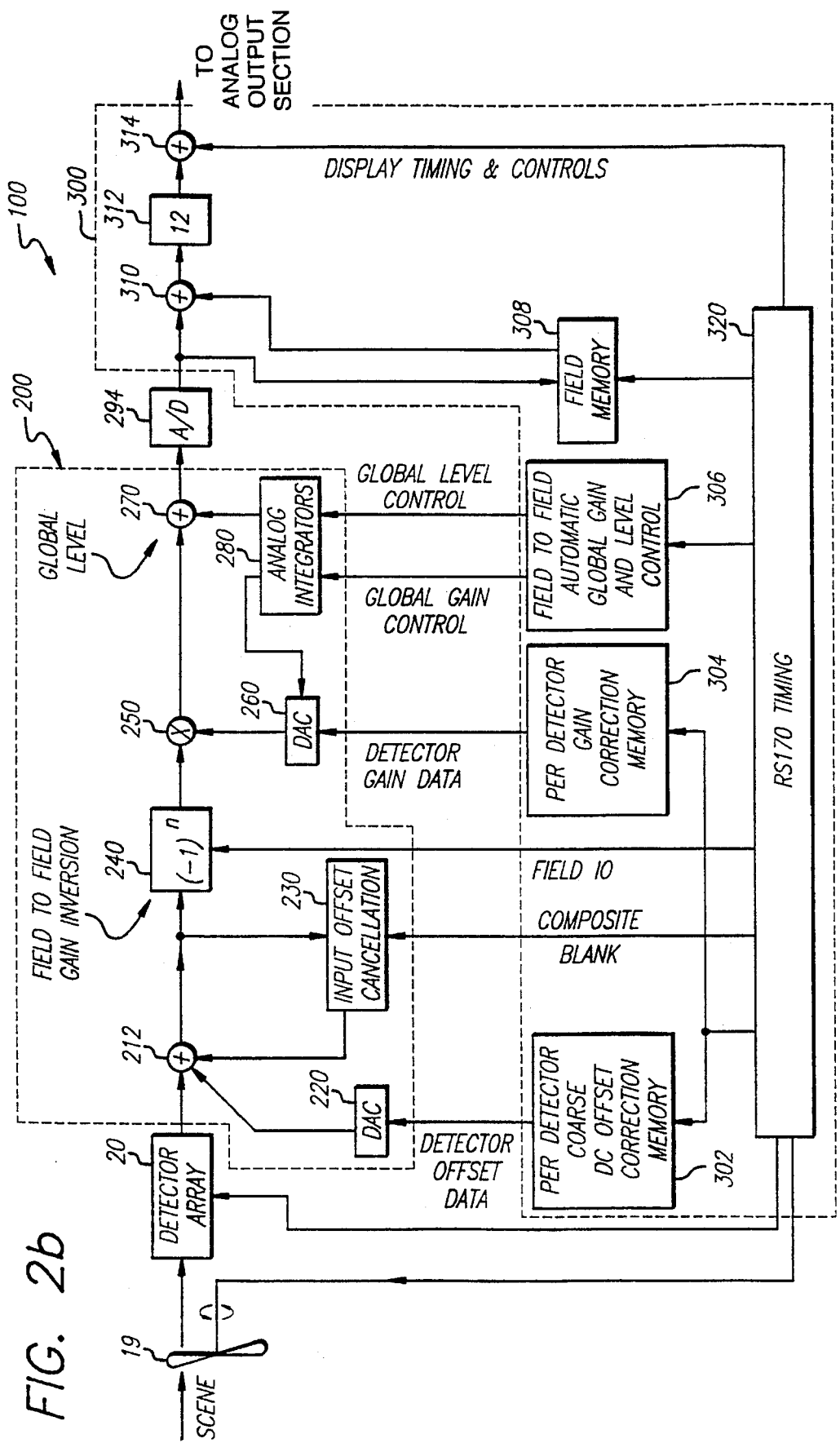
FIG. 2b is a simplified block diagram of the analog input section and the digital signal processing section.

FIG. 2a is a block diagram of the analog input section 200. FIG. 2b is a simplified block diagram of the analog input section and the digital section 300. Serial video signals are received from the infrared detector array 20. As mentioned above, the video signals consist of the two fields of alternating polarity separated by inactive intervals and offset by a DC level. This signal is passed through a buffer amplifier 210 and applied to a first adder circuit 212. The adder 212 has three inputs: the video signal, an individual pixel offset signal from a first digital-to-analog converter (DAC) 220, and a feedback signal from a first integrator circuit 230.

In accordance with the present teachings, in a calibration mode, a uniform cold reference pattern is used to illuminate the array while the outputs are scanned into the field memory 308 of the digital section 300. In the preferred embodiment, the inventive digital section 300 is implemented with a field programmable gate array with firmware stored in a programmable read-only memory (PROM). However, those skilled in the art will appreciate that the invention may be implemented in software in a microprocessor or implemented in hard-wired logic circuits without departing from the scope of the present invention. The output of each detector should be zero. As discussed more fully below, offset correction signals for the nonzero detector outputs are stored in digital form in a detector coarse DC offset correction memory 302 in the digital section 300. These signals are used for offset correction of the instantaneous signals output by each detector via a DAC 220 and an adder 212.

Figure 3:
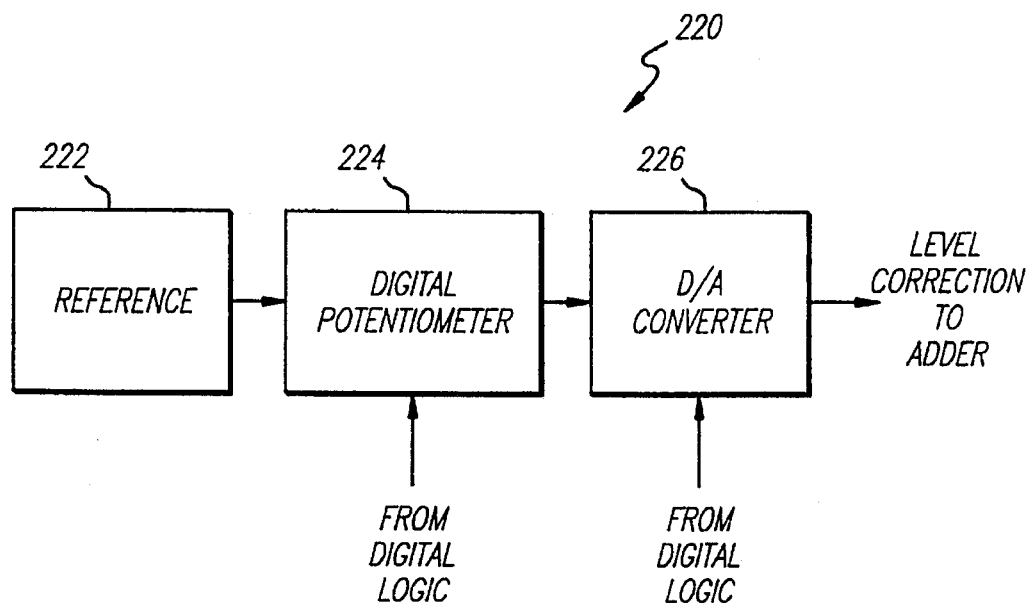
FIG. 3 is a block diagram of an illustrative implementation of a first digital-to-analog converter of the analog section of the signal processing system of the present invention.

FIG. 3 is a block diagram of an illustrative implementation of the DAC 220. A source of reference potential 222 provides a reference signal to a digital potentiometer 224. Since the range of offset correction required varies from detector to detector, the range of the digital-to-analog converter 226 is matched to each detector by the digital potentiometer 224, whereupon, the digital-to-analog converter 226 converts the stored offset signals to an analog output signal for input to the adder 212.

The integrator 230 averages several successive fields and drives the running sum to zero to eliminate the average offsets. The first integrator 230 cancels the DC offset of the input signal and performs a function similar to AC coupling with a long time constant. That is, the average value of the active period is set to zero by integrating the video and feeding the result with negative polarity back into the first adder circuit 212.

Figure 4:
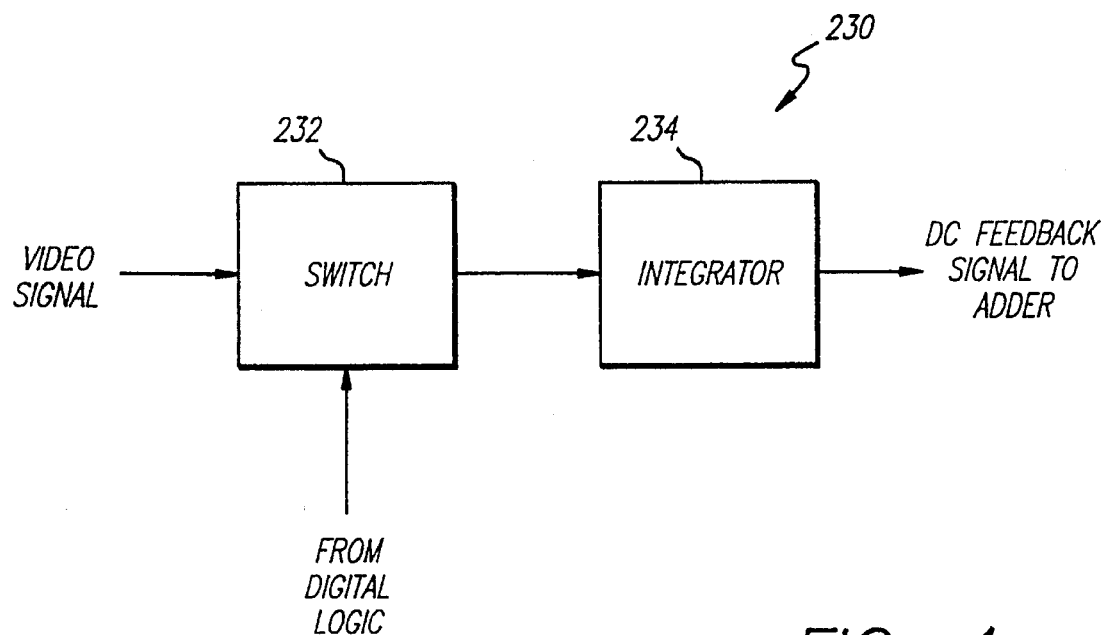
FIG. 4 is a block diagram of an illustrative implementation of a first integrator circuit of the analog section of the signal processing system of the present invention.

FIG. 4 is a block diagram of an illustrative implementation of the first integrator circuit 230. The switch 232 receives a blanking signal from a timing circuit 320. The RS 170 display controller timing circuit 320 provides timing for the system suitable for the RS 170 video format. The blanking signal serves to disable the integrator 234 during inactive periods in the video signal.

Figure 4A:
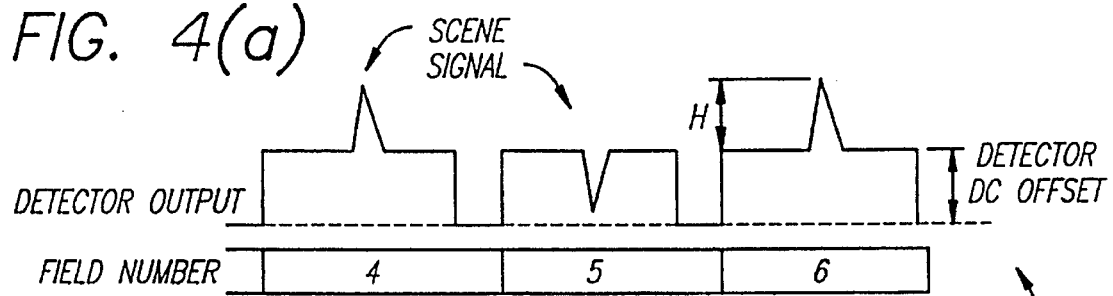
FIG. 4(a) is a waveform illustrating the output of a typical pyroelectric detector.
Figure 4B:
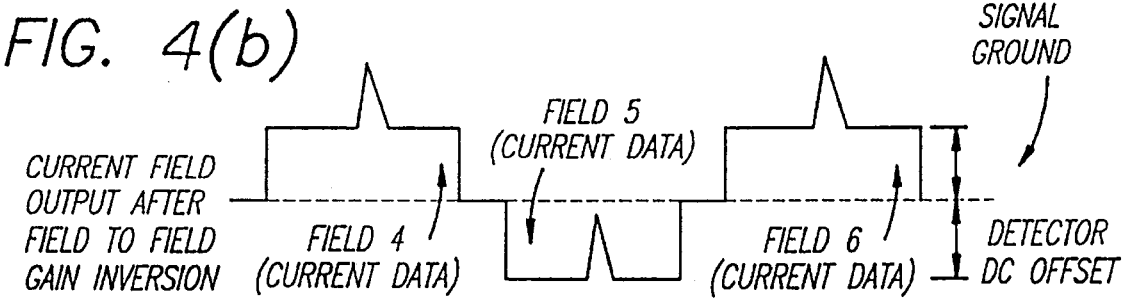
FIG. 4(b) is a waveform illustrating a the waveform of FIG. 4(a) after field-to-field gain inversion in accordance with the present teachings.

Returning to FIG. 2b, the output of the adder 212 is input to a unity gain inversion circuit or polarity switch 240 which operates under control of the RS 170 timing circuit 320. The polarity switch 240 is implemented with analog switches. The input/output waveform of the polarity switch 240 is shown in FIGS. 4(a)–4(b). As discussed more fully below, a significant feature of the present invention derives from the inversion of alternating fields of the output of each detector by the unity gain inversion circuit 240. This facilitates field to field subtraction which effectively cancels DC offset in each field while preserving the AC signal for subsequent processing.

Figure 4C:
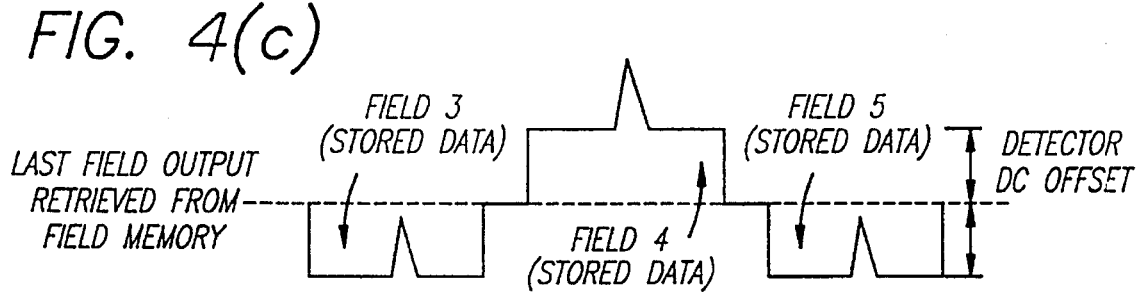
FIG. 4(c) illustrates a previous field of output from a pyroelectric detector.
Figure 4D:
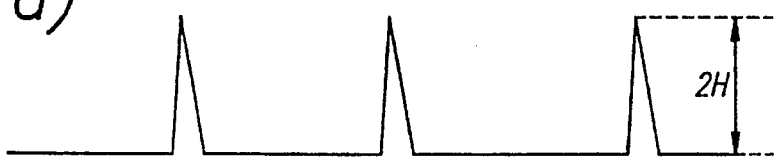
FIG. 4(d) is a waveform illustrating the output after a summation of the waveforms shown in FIGS. 4(b) and 4(c).

FIG. 4(a) is a waveform illustrating the output of a typical pyroelectric detector. FIG. 4(b) is a waveform illustrating a the waveform of FIG. 4(a) after field-to-field gain inversion in accordance with the present teachings. FIG. 4(c) illustrates a previous field of output from a pyroelectric detector. FIG. 4(d) is a waveform illustrating the output after a summation of the waveforms shown in FIGS. 4(b) and 4 (c).

As mentioned above, the chopper 19 chops the scene at the field rate so that there is a detector output every field. See FIG. 4(a). The polarity switch 240 effects field-to-field gain inversion in such a way that for the even fields (n=0, 2, 4, 6, . . . ), the resulting output equals (1) times the detector output and for the odd fields (n=1, 3, 5, . . . ), the resulting output equals (−1) times the detector output. See FIG. 4(b). Then the inverted signal is digitized by the analog-to-digital converter 294. Alternating fields are stored in a field memory 308. Data from a previous field (field n−1) (FIG. 4(c)) is retrieved from the field memory 308 and summed with the current field (field n) to cancel the DC bias in each field (FIG. 4(d)). As shown in FIG. 4(d), after summing fields n−1 and n together in the adder 310, the detector DC bias is canceled, but the resulting detector scene signal is doubled. Hence, a divide by two circuit 312 is used to scale the detector scene signal back to its correct signal amplitude.

A second step in the calibration process involves the illumination of the array 20 with a uniform warm reference pattern. The outputs of the detectors should be equal. The equal and nonequal outputs are digitized and individual correction signals are stored in a gain correction memory 304 in the digital section 300 and used for sensitivity correction via a multiplier 250 and a second DAC circuit 260.

Figure 5:
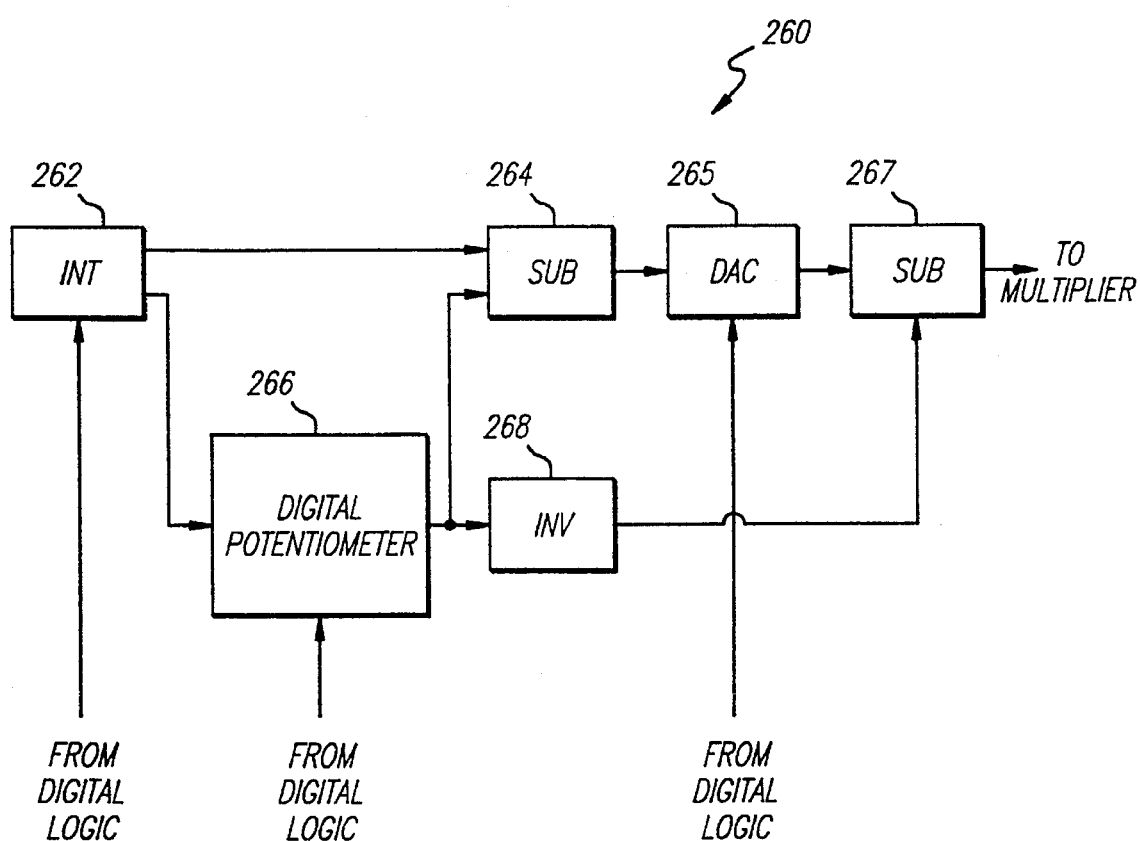
FIG. 5 is a block diagram of an illustrative implementation of a second digital-to-analog converter of the analog section of the signal processing system of the present invention.

FIG. 5 is a block diagram of an illustrative implementation of the DAC circuit 260. The integrator 262 integrates pulses from the digital section 300 to create a voltage level proportional to the desired video gain. This controls the global gain applied to the detector with the weakest signal output. This gain factor is further reduced to a minimum value for the detector with the strongest output in sensitivity calibration. The range of gain control is set by a digital potentiometer 266. The integrator 262 and the potentiometer 266 feed a subtractor circuit 264 which in turn provides an input signal to a multiplying D/A (digital-to-analog) converter 265 which sets intermediate levels. As the range of the D/A converter is reduced, a complementary DC level is added to the output by an inverter 268 and a subtractor 267 to keep the full scale output of the multiplier 250 constant.

Returning to FIG. 2b, in addition to a limiter 290, two feedback loops are used to control the dynamic range of the signal (i.e. scale) going into the A/D (analog-to-digital) converter 294 using control circuit 306 and integrator 280 as input to summer 270. The output of the A/D converter is fed to a field-to-field automatic global gain and level control circuit 306 in the digital section 300. The field-to-field automatic global gain and level control circuit 306 compares the digitized signal to upper and lower threshold values. If the digital value is above the upper threshold, a high level is output to an offset integrator 280. If the value is below the lower threshold, a low level is sent to the integrator 280. Levels between the thresholds tri-state the output to the integrator resulting in no signal from the digital section 300. This output is also tri-stated during inactive video periods. The integrator 280 is referenced to a voltage midway between the two logic levels. The result is that equal numbers of pixels will fall above the upper threshold and below the lower threshold. This provides automatic global level control across the array 20.

Automatic gain control may be effected in accordance with any one of a number of schemes are well known in the art. In the preferred embodiment, automatic gain control is provided by generating a high level when the signal is outside the previously described thresholds, a low level when it is within the thresholds, and tri-state when the video is inactive. This is fed to the integrator 262 of FIG. 5 and compared to a reference that is a fraction of the logic level (10% for example). The result is that most of the pixels (90%) will fall between the thresholds and a few pixels (10%) will be above or below the thresholds.

Thus, as depicted in FIG. 1, the digital signals from the analog input section 200 are processed by digital section 300 and stored in its frame memory. The digital output from the digital section 300 is converted to standard video format (typically RS 170) by an analog output section 400.

Figure 6:
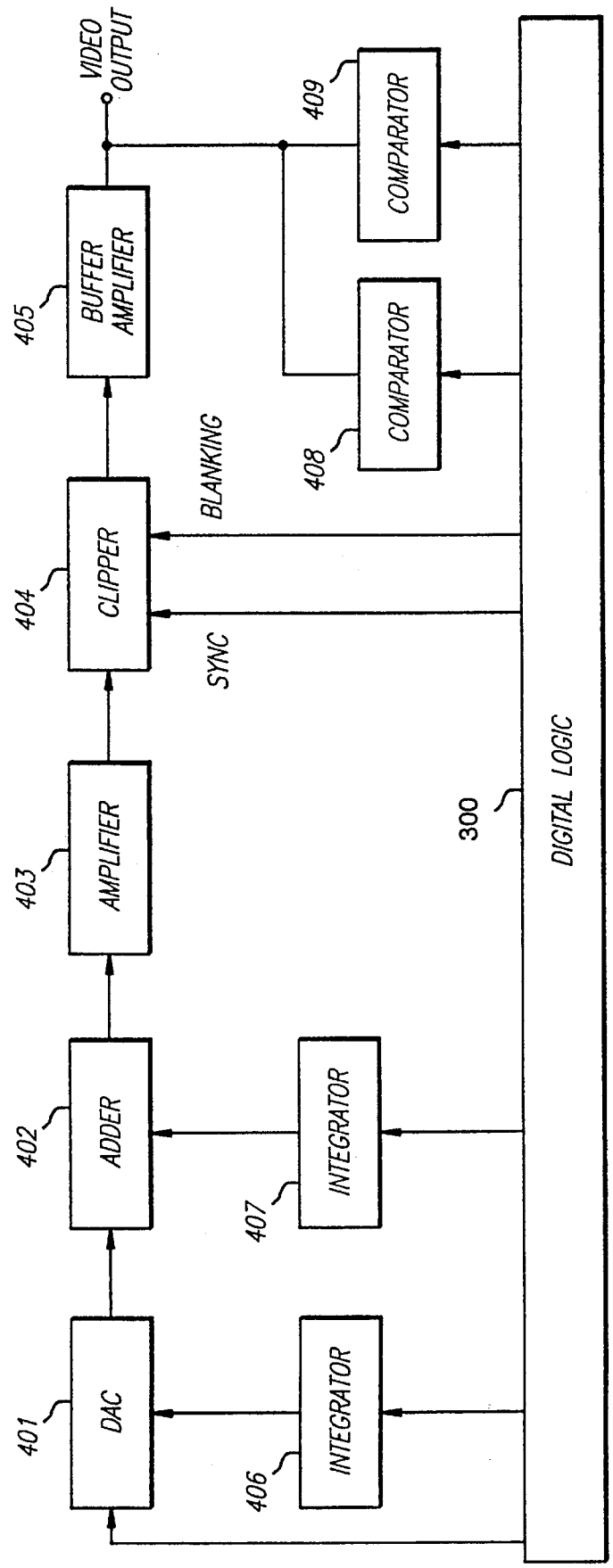
FIG. 6 is a block diagram of an illustrative implementation of the analog output section of the signal processing system of the present invention.

FIG. 6 is a block diagram of an illustrative implementation of the analog output section 400. The video signal comes from the digital logic section 300 as successive pixel values. These digital signals are converted to analog form by a DAC 401. The scale factor of these signals is varied by using the output of an integrator 406 as the reference voltage for the DAC 401. A second integrator 407 is used to supply an offset voltage which is added to the DAC output in an adder stage 402. The output of the adder is then amplified in an amplifier stage 403 to the final output level desired. The video signal is then combined with sync and blanking pulses from the digital logic using a clipper circuit 404. The clipper circuit 404 is arranged such that the most negative signal passes to its output. The sync signal is adjusted such that its negative excursion is below the blanking and video signal levels and its positive excursion is above the video signal range. The blanking signal is adjusted such that its negative level is below the video range but above the negative sync level and its positive level is above the video signal range. When the sync signal is negative, the output is at the sync level regardless of the blanking and video signal levels. When the sync signal is positive and the blanking level is negative, the output is at the blanking level regardless of the video level. When both the sync and blanking signals are positive, the output follows the video signal. A buffer amplifier 405 provides the output current necessary to drive the load (typically 75 ohms) placed on the circuit. Feedback may be applied around the amplifier clipper and buffer stages to control their overall gain.

The comparators 408 and 409 are used to detect when the output exceeds the middle of video range (408) or falls outside two thresholds set near the limits of the video range 409.

The automatic level control operates by using the digital logic to gate the output of the comparator 408 with the blanking pulse. The output of the digital logic is open circuited (tri-state) during the blanking periods. It is low when the video is below the midpoint value and high if the video is above the midpoint value. This signal is integrated by an integrator 407 which is referenced to a voltage midway between the high and low logic levels. The output of the integrator controls the offset added to the video signal. An equilibrium condition is established where half of the pixels are above midscale and half are below.

The other comparator 408 is a window comparator with limits set near the limits of the video range (typically at 10% and 90% of the video range). The automatic gain control operates by using digital logic to gate the window comparator with the blanking pulse. The output of the digital logic is open circuited (tri-state) during the blanking periods. It is low when the video signal is within the window and high when the video signal is outside the window. This signal is integrated by an integrator 406 which is referenced to a voltage that is a fraction of the digital logic voltage (typically 5%). The output of the integrator varies the reference voltage of the DAC 401. This forms a feedback loop that reaches an equilibrium condition when 95% of the pixels fall between the 10% and 90% o levels of the video range.

The digital section 300 is disclosed and claimed in U.S. patent application Ser. No. 08/226,588, filed herewith, by Masarik et al., now U.S. Pat. No. 5,528,035, the teachings of which are incorporated herein by reference, would be used for the illustrative application.

Thus, the present invention has been described herein with reference to a particular embodiment for a particular application. Those having ordinary skill in the art and access to the present teachings will recognize additional modifications applications and embodiments within the scope thereof. For example, the invention is not limited to use with BST pyroelectric detectors. The invention may be used with cooled and uncooled detectors alike.

It is therefore intended by the appended claims to cover any and all such applications, modifications and embodiments within the scope of the present invention.

Accordingly, what is claimed is:

1. A signal processor for use with an array of detectors, each detector having an amplifier associated therewith and each amplifier providing gain, the processor comprising:

means for compensating for a DC offset of each detector of the array;

means for correcting variations in the sensitivity of each detector amplifier, the second means providing a digital video signal;

a D/A converter for converting the digital video signal to an analog video signal;

means for scaling an input to the D/A converter; and means for adding blanking signals and sync pulses to the analog video signal.

2. The invention of claim 1 wherein the detectors are fabricated of barium-strontium-titanate.

3. The invention of claim 1, wherein the means for scaling the first D/A converter includes a source of reference potential; and a digital potentiometer for modulating the reference potential in response to the range of the detector/amplifier pairs, an output of the digital potentiometer being coupled to a reference input of the first D/A converter.

4. The invention of claim 1, wherein the means for scaling the input to the D/A converter includes means for establishing a reference potential that is proportional to a desired gain; a digital potentiometer for modulating the reference potential in response to the range of the detector/amplifier pairs, an output of the digital potentiometer being coupled to a reference input of the D/A converter; and means for adding a complementary dc signal to the output of the D/A converter, the complementary dc signal being inversely related to the range of the D/A converter.

5. The invention of claim 1 further including means for adjusting for field-to-field offsets.

6. The invention of claim 1 further including:

means for generating a window signal when the detector, amplifier pair outputs are outside a predetermined window of thresholds; and an integrator for integrating the window signal, an output of the window signal being coupled to an input of the means for scaling the D/A converter.

7. The processor of claim 1 wherein the blanking signal is adjusted such that its negative level is below the range of the analog video signal but above the negative level of the sync pulses and its positive level is above range of the analog video signal.

8. The processor of claim 1, wherein said scaling means includes:

a window comparator for generating a window signal when the detector/amplifier pair outputs are outside a predetermined window of thresholds; and an integrator for integrating the window signal, an output of the integrator being coupled to a reference input of the D/A converter.

* * * * *